United States Patent [19]

Reed

[11] Patent Number: 5,068,835
[45] Date of Patent: Nov. 26, 1991

[54] ACOUSTIC HOLOGRAPHIC ARRAY MEASUREMENT DEVICE AND RELATED MATERIAL

[75] Inventor: Michael A. Reed, Portsmouth, N.H.

[73] Assignee: Environmental Products Corporation, Fairfax, Va.

[21] Appl. No.: 584,507

[22] Filed: Sep. 17, 1990

Related U.S. Application Data

[63] Continuation of Ser. No. 413,941, Sep. 28, 1989, abandoned.

[51] Int. Cl.⁵ .............................................. B07C 5/00
[52] U.S. Cl. ..................................... 367/135; 367/96; 367/87; 367/11; 367/8; 209/524
[58] Field of Search ................... 367/8, 11, 87, 95, 96, 367/117, 124, 125, 135, 137, 122, 105; 209/522-524; 194/209; 100/902

[56] References Cited

U.S. PATENT DOCUMENTS

| | | | |
|---|---|---|---|
| 3,955,179 | 5/1976 | Planke | 209/525 |
| 4,070,643 | 1/1978 | Green | 367/8 |
| 4,248,334 | 2/1981 | Hanley et al. | 194/209 |
| 4,316,533 | 2/1982 | Hughes et al. | 194/213 |
| 4,459,487 | 7/1984 | Leser | 250/560 |
| 4,557,386 | 12/1985 | Buckley et al. | 367/8 |
| 4,651,879 | 3/1987 | Harris et al. | 209/523 |
| 4,870,623 | 9/1989 | Buckley et al. | 367/7 |

Primary Examiner—Daniel T. Pihulic
Attorney, Agent, or Firm—Finnegan, Henderson, Farabow, Garrett & Dunner

[57] ABSTRACT

An acoustic device and related method for measuring the shape of an object. The device includes a plurality of transmitters for transmitting acoustic waves at an object to be measured and a plurality receivers for receiving the acoustic waves reflected by the object. A phase detector measures phase data of the reflected acoustic waves, the phase data being processed to calculate a value representing a shape of the object as a function of the phase data. This value is then compared with known reference value to accurately identify the shape of the object.

16 Claims, 5 Drawing Sheets

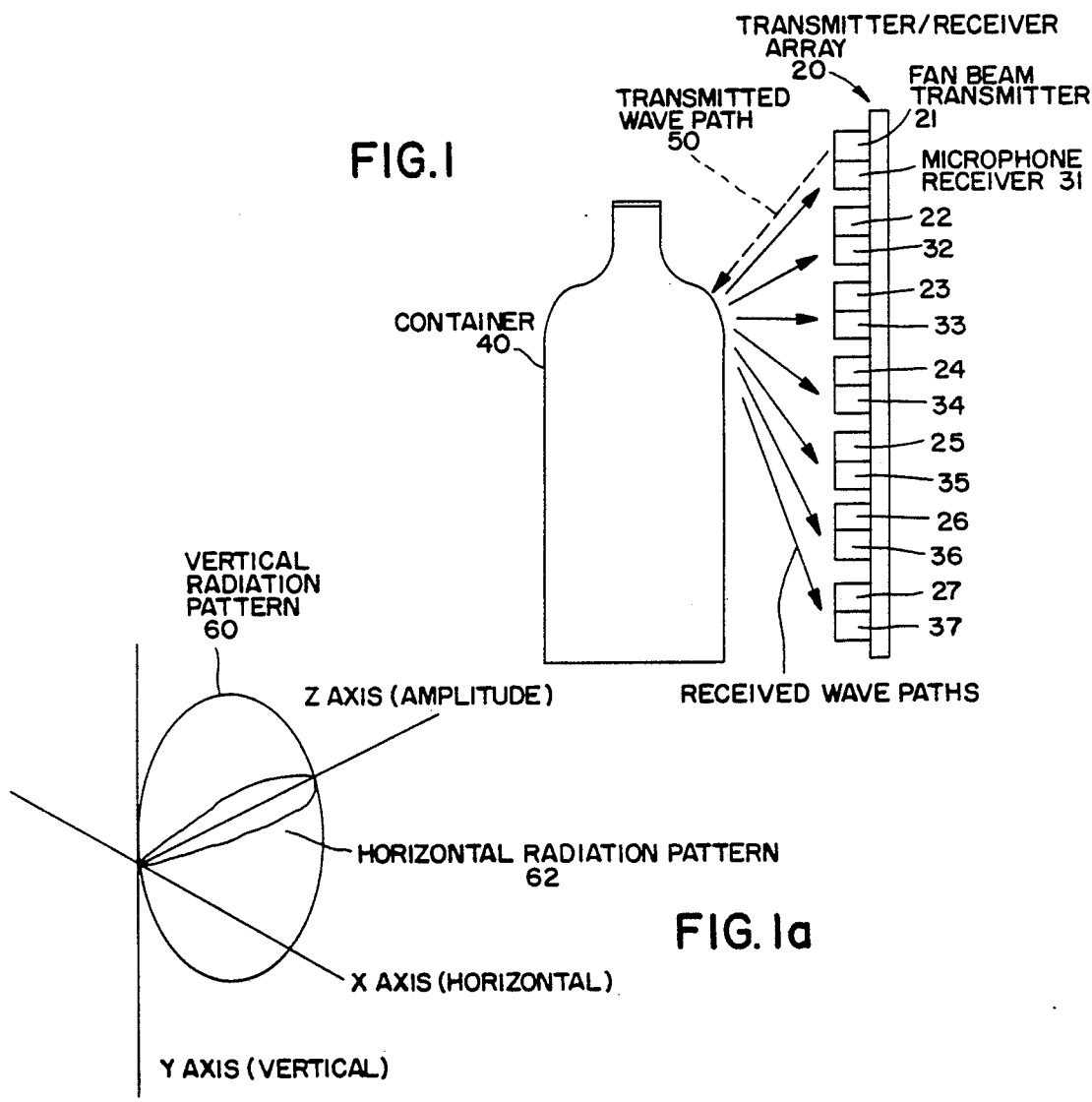
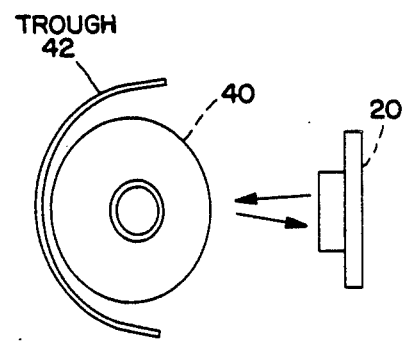

ACOUSTIC HOLOGRAPHIC ARRAY MEASUREMENT DEVICE AND RELATED MATERIAL

This application is a continuation of application Ser. No. 413,931, filed Sept. 28, 1989 now abandoned.

BACKGROUND OF THE INVENTION

I. Field of the Invention

The invention relates generally to an acoustic holographic array, and specifically to an acoustic device for measuring the shape of an object.

II. Related Art

Known systems for forming acoustic discriminator hologram patterns typically include an acoustic transmitter for transmitting acoustic waves at an object to be examined, and an acoustic receiver transducer for detecting acoustic signals from the transmitter which have passed by or through the object or have been defracted or reflected therefrom, the acoustic receiver transducer scanning over a desired area of the object. A sampler takes substantially instantaneous samples of the amplitude of the signals received from the acoustic receiver transducer at predetermined time intervals. Such systems are complicated in construction and require that the acoustic receiver transducer repeatedly scan the object to be measured to produce useful data concerning the shape of the object.

Other systems for measuring the shape of an object include a light source which transmits light toward the object to be measured. A photoelectric sensing unit is positioned behind the object and detects the shadow image of the object and the transition between and light and shadow caused by the boundary of the object. The photoelectric sensing unit detects the amplitude of the light transmitted from the light source through the object and thus can be used to identify characteristics of the shape of the object. However, such systems suffer from the disadvantage that the identified characteristics of the edges of the objects may be distorted due to the shape and composition of the objects. Thus, the accuracy of such systems is reduced.

SUMMARY OF THE INVENTION

Accordingly, it is an object of the present invention to provide a device and related method for measuring the shape of an object which is simple in construction and accurate in performance.

It is a further object of the present invention to provide a device and related method which provide a fast and efficient method of classification and recognition of the shape of an object, while avoiding excessive memory requirements.

Additional objects and advantages of the invention will be set forth in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention as embodied and broadly described herein, the invention comprises a device and related method for measuring the shape of an object, the device including a plurality of transmitters for transmitting acoustic waves at the object, a plurality of receivers for receiving the acoustic waves reflected by the object, a total phase detector for measuring the total phase data of the received acoustic waves, a processor for calculating a value representing the shape of the object as function of the total phase data and means for comparing the value with predetermined reference values to identify the shape of the object.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 1 is a side view of a preferred embodiment of a measuring device embodying the teachings of the present invention;

FIG. 1a is an isometric view of an acoustic radiation transmission pattern from the transmitting transducer illustrated in FIG. 1;

FIG. 2 is a top view of the device illustrated in FIG. 1;

DESCRIPTION OF THE PREFERRED EMBODIMENT

Figure 3A:
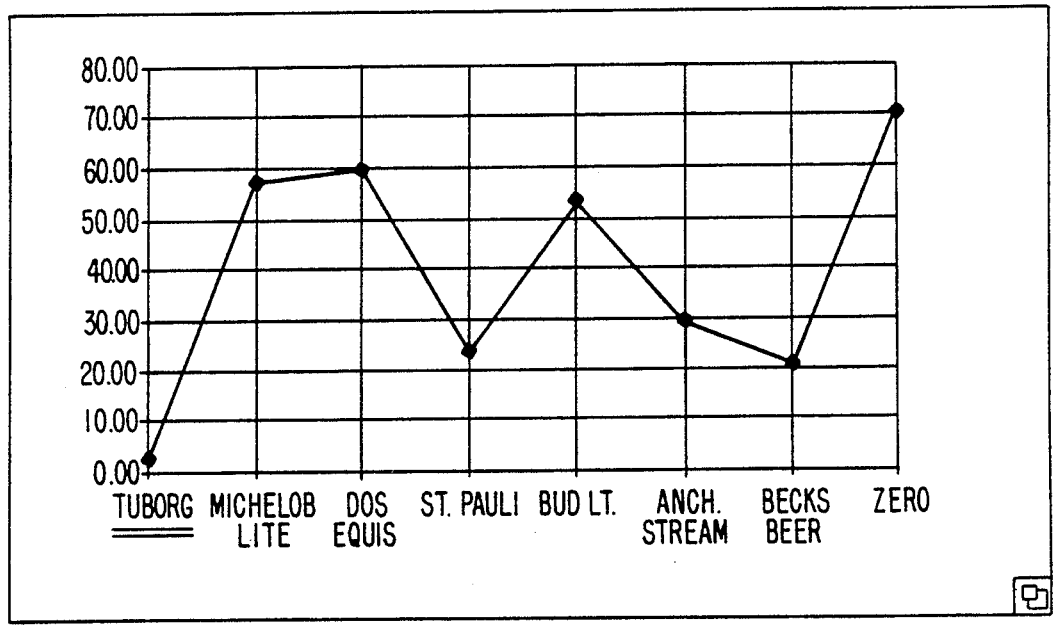
FIG. 3a is a plot illustrating the output of the device illustrated in FIG. 1.
Figure 3B:
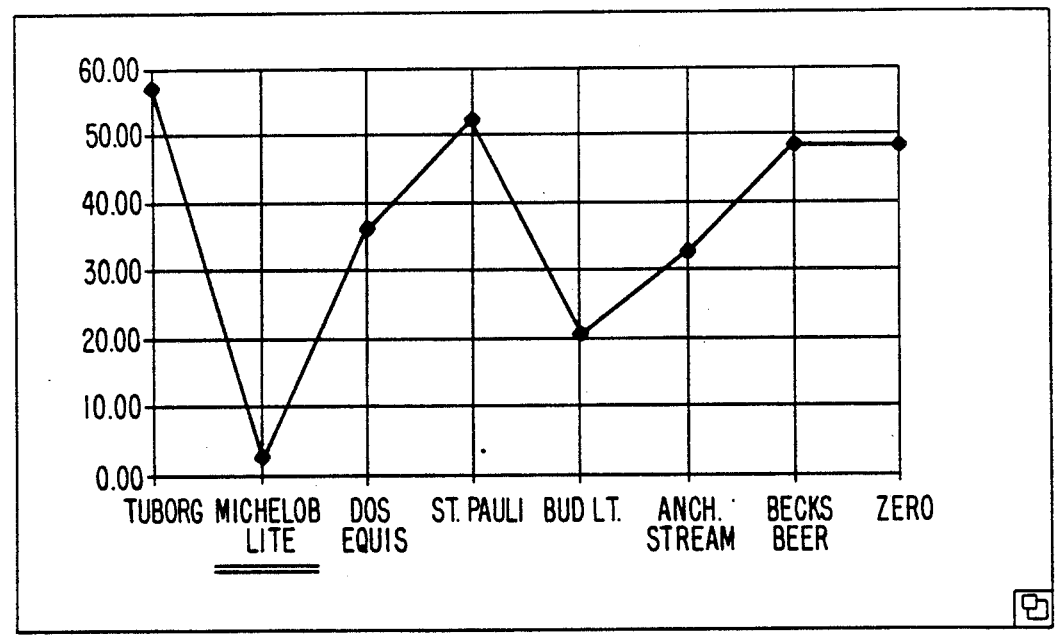
FIG. 3b is a second plot illustrating an output of the device illustrated in FIG. 1.
Figure 3C:
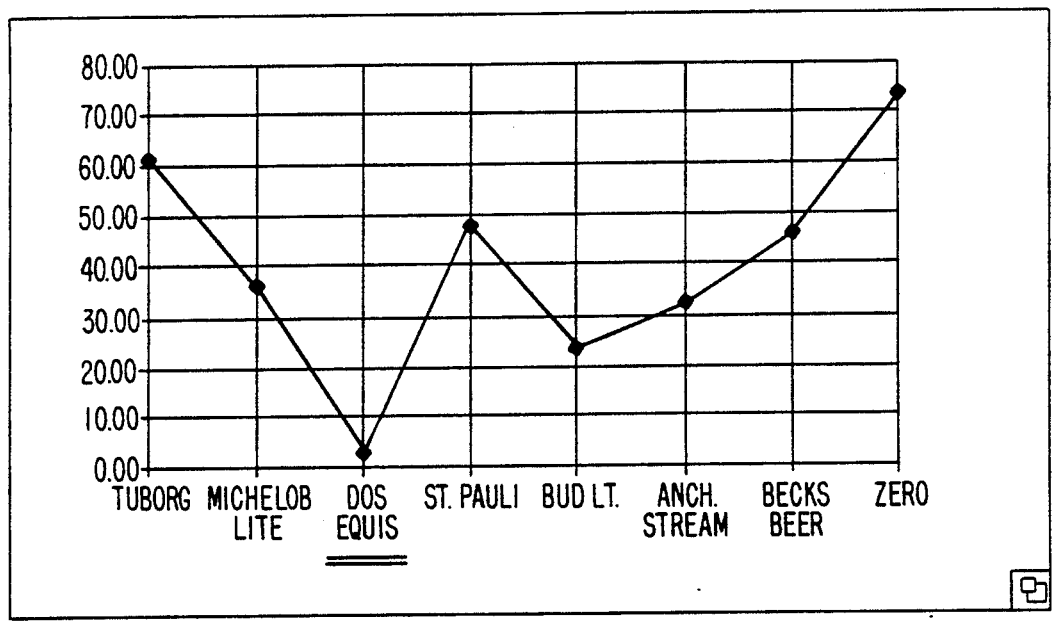
FIG. 3c is a third plot illustrating another output of the device illustrated in FIG. 1.

Reference will now be made in detail to the present preferred embodiment and method of the invention, examples of which are illustrated in the accompanying drawings. Wherever possible the same reference numbers will be used throughout the drawings to refer to same or like parts.

The present invention utilizes holographic concepts with ultrasonic sound waves. The concept is based on the reflection and scattering of sound waves from an object to be measured or imaged. The total phase of the sound waves is calculated by measuring the time necessary for the front of sound waves to travel from a transmitter, reflect from the object and return to a receiver in whole wavelengths plus a fraction of one wavelength of the transmitted signal in the medium of propagation. The term phase data hereafter refers to either the total phase or the fractional component of the total phase. The amplitude and total phase of the scattered waves may be measured over a plane (for two-dimensional analysis) or a line (for onedimensional analysis). The resulting total phase and amplitude array is used to reconstruct the shape of the original object, subject only to sampling limitations on the phase data.

The basic spatial characteristics of the object to be measured are preserved when the array of phase data is calculated. The use of only phase data reduces the amount of memory necessary to store amplitude data and further reduces the processing time necessary to process the phase data. The subject invention processes the phase data to generate values unique to the shape of the object to be measured. As a result, the physical shape of the object is converted to a series of phase related values unique to that shape.

FIG. 1 is a side view of a system showing major components of a preferred embodiment of a measuring device embodying the teachings of the present invention. As shown in FIG. 1, the system comprises a transmitter/receiver array 20. Array 20 includes a plurality of pairs of individual transmitters and corresponding receivers for transmitting acoustic waves to and receiving acoustic waves from the object to be measured, such as a container 40. In a presently preferred embodiment of the present invention, array 20 comprises seven pairs of vertically oriented fan beam ultrasonic transmitting transducers 21-27 and corresponding omnidirectional pressure sensitive broadband microphone receivers 31-37 arranged in a vertical array so that the acoustic waves transmitted from transmitters 21-27 overlap in the vertical direction. Such a preferred radiation pattern is illustrated in FIG. 1a which illustrates a preferred vertical radiation pattern 60 and a preferred horizontal radiation pattern 62. The spacing between each of transmitters 21-27 and corresponding receivers 31-37 may be predetermined depending on the size of the object to be measured. For example, if container 40 is a common twelve ounce beverage container, transmitters 21, 22, 23, 24, 25, 26, 27 and receivers 31, 32, 33, 34, 35, 36, 37 are preferably spaced approximately two inches apart.

The system of the subject invention is further illustrated in FIG. 2. As shown in FIG. 2, an object to be measured, such as a container 40, is provided in a U-shaped trough 42. Transmitter 21 of transmitter/receiver array 20 transmits a high frequency ultrasonic signal toward container 40. Preferably, the signal has a frequency of approximately 50 kHz and a wavelength of approximately 0.27 inches. The signal is reflected by container 40 and received by receivers 31-37 in array 20. Each receiver 31-37 measures the phase of the reflected signal. Receivers 31-37 therefore comprise phase detector means for measuring the signals reflected by container 40. The signal from each of receivers 31-37 is passed to a signal processor (not shown) which processes the data and extracts the phase data of the received signal for each path of reflection from transmitter 21 to container 40 and back to each of receivers 31-37 and stores the phase data of each received signal which is unique to the shape of container 40 as compared to a reference shape. In a preferred embodiment, the sequence of transmission by one transmitter, such as transmitter 21, and reception by each of the receivers 31-37 is repeated for each of transmitters 22-27. The resulting phase data forms a data array seven by seven in size generated by each pair of transmitters and receivers. The diagonal of the data array represents the transmission reflection path from each transmitter 21-27 to its corresponding receiver 31-37, respectively. The data array as a whole contains phase data unique to container 40 which may be processed by the signal processor to measure the shape of container 40. For example, the signal processor can perform a square root of the sum of the squares comparison of the differences in the phase data to generate values representing the shape of container 40, as compared to stored phase data, phase data of a reference shape, phase data of other containers in a test or phase data of a zero reference shape. Results of this processing are illustrated in FIGS. 3a-3g.

FIGS. 3a-3g illustrate a series of measurements that have been performed by a second preferred embodiment of the subject invention which transmits acoustic waves having a frequency of 20 kHz and illustrate the accuracy of the device and method of the claimed invention. In the measurements, the shapes of seven distinctly shaped containers 40 were measured individually using phase data generated by one transmitter and four receivers and compared with each other and a zero reference shape to identify each container. In each of FIGS. 3a-3g, the Y-axis represents square root of the sum of the squares of the difference between the phase data generated for each container 40 as compared to the phase data of each other container measured and the zero reference shape. A value of 0.00 represents a perfect match between the shapes of the respective containers, while higher values represent increased distinctness between the shapes of the containers.

FIG. 3a compares the phase data of the seven beer bottles against a known reference shape, in this case the shape of a Tuborg bottle which is double underlined. As illustrated in FIG. 3a, the shape of the Tuborg bottle is readily identified, as illustrated by the minimum least squares value of almost 0. The other bottles, which differ in shape from the Tuborg bottle, all reflect values substantially higher than 0.

Figure 3D:
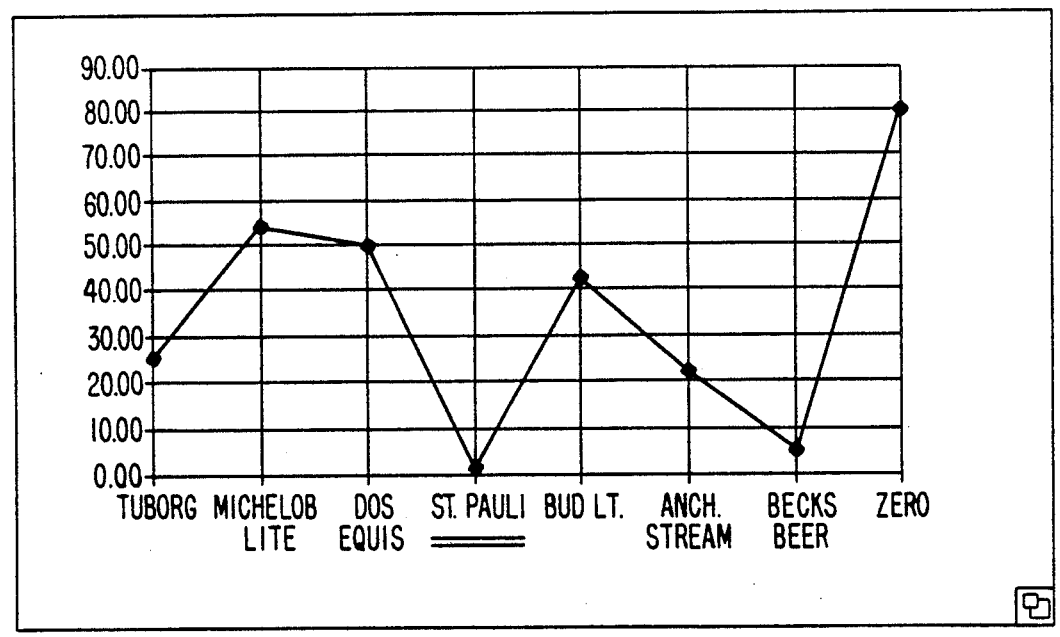
FIG. 3d is a fourth plot illustrating another output of the device illustrated in FIG. 1.
Figure 3E:
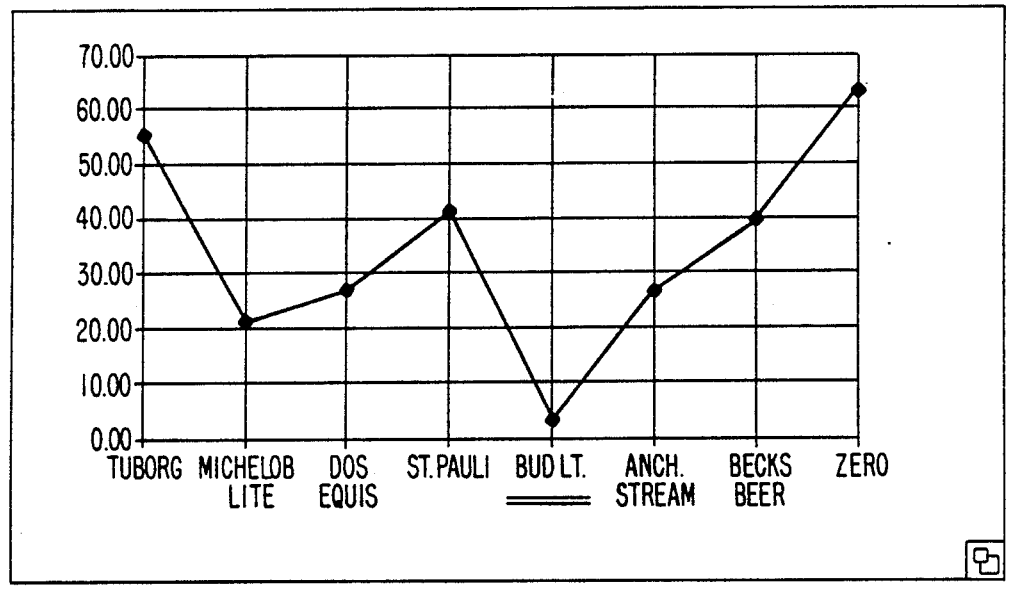
FIG. 3e is a fifth plot illustrating another output of the device illustrated in FIG. 1.
Figure 3F:
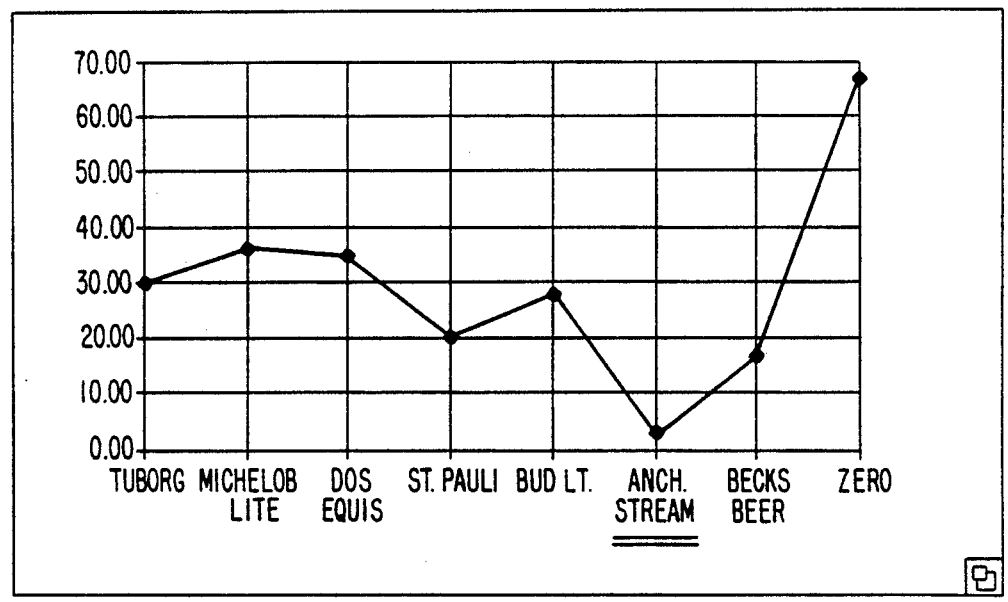
FIG. 3f is a sixth plot illustrating another output of the device illustrated in FIG. 1.
Figure 3G:
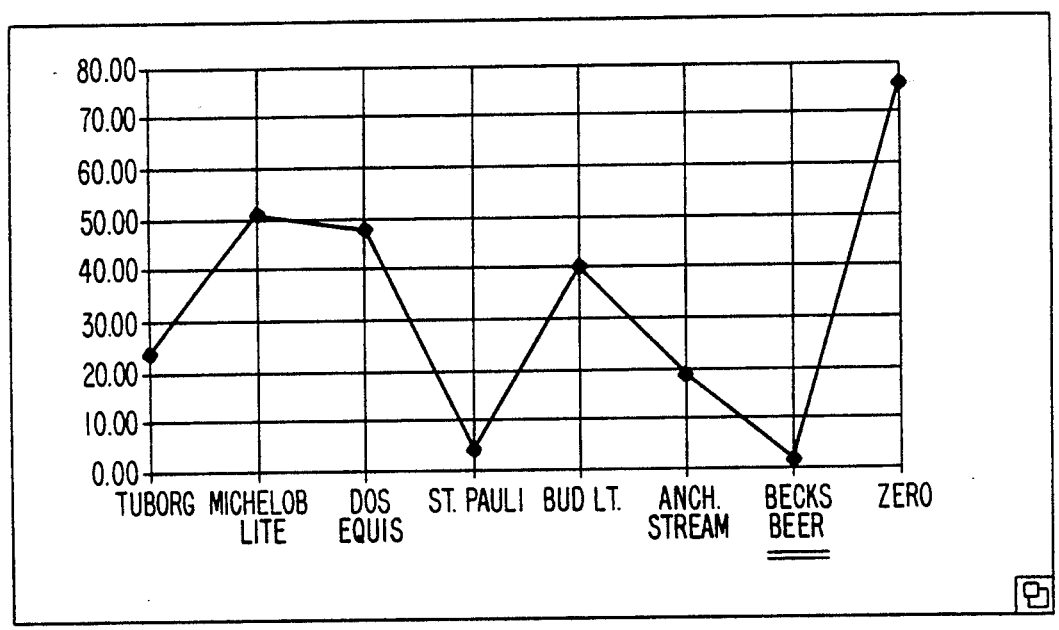
FIG. 3g is a seventh plot illustrating another output of the device illustrated in FIG. 1.

FIGS. 3b-3g illustrate results similar to those illustrated in FIG. 3a. In each measurement, the system of the subject invention accurately identifies the shape of one of the sample beer bottles as that of the reference bottle. Even when two of the bottles are substantially identical in shape, as in the case of the Becks beer bottle and the St. Pauli Girl beer bottle, the system of the subject invention differentiates between the shapes of the two bottles using phase data received from only four receivers. The results of the specific measurements of the shapes of these two bottles are illustrated in FIGS. 3d and 3g.

Thus, the subject invention provides a simple, economical, and accurate way for measuring the shape of an unknown object. Other embodiments of the invention, such as using more or less than the preferred seven transmitter and receiver pairs or using unequal numbers of transmitters and receivers which may not be located together in pairs, will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An acoustic device for measuring the shaped of an object comprising:
    transmitter means including a series of transmitters disposed in a spaced sequence, for transmitting an acoustic signal from each of the spaced transmitters in sequence toward an object to be measured;
    receiver means for receiving a signal reflected by the object while said transmitter means is not transmitting between the signal transmissions during said sequence of acoustic signals;
    measurement means for measuring phase data of said reflected signal received by said receiver means;
    calculator means for calculating values representing the shape of the object as a function of said phase data; and
    means for comparing said values with predetermined reference values to identify the shape of the object.

2. A device according to claim 1, wherein said comparison means compares stored phase data to the square root of the sum of the squares of said phase data calculated by said calculation means to identify the shape of said object.

3. A device according to claim 1, wherein said receiver means includes a plurality of microphone receivers.

4. A device according to claim 1, wherein said transmitter means radiates said sequence of acoustic signals in substantially a fan beam pattern.

5. A device according to claim 1, wherein said transmitter means and said receiver means comprise a plurality of transmitter and receiver pairs arranged in a one dimensional array.

6. A device according to claim 1, wherein said transmitter means and said receiver means comprise a plurality of transmitter and receiver pairs arranged in a two dimensional array.

7. A device according to claim 1, wherein said comparison means compares a representation of said phase data with a predetermined representation of a reference object to determine if said measured phase data represents said reference object.

8. A device according to claim 1, wherein said comparison means compares phase data differences between said measured phase data to stored phase data to identify the shape of said object.

9. An acoustic method for measuring the shape of an object comprising the steps of:

transmitting a sequence of acoustic signals from a series of spaced transmitters toward the object;

receiving a signal reflected by the object while not transmitting between the signal transmissions during said sequence of acoustic signal transmissions;

measuring phase data of said reflected signal;

calculating values representing the shape of the object as a function of said phase data; and comparing said values with predetermined reference values to identify the shape of the object.

10. A method according to claim 9, wherein said comparison step includes comparing phase data differences between said measured phase data to stored phase data to identify the shape of said object.

11. A method according to claim 9, wherein said comparison step includes comparing stored phase data to the square root of the sum of the squares of said values calculated in said calculating step to identify the shape of the object.

12. A method according to claim 9, wherein said receiving step includes receiving said reflected signal using a plurality of microphone receivers.

13. A method according to claim 9, wherein said transmitting step includes radiating said sequence of acoustic signals in substantially a fan beam pattern.

14. A method according to claim 9, wherein said transmitting step and said receiving step include transmitting and receiving said sequence of acoustic signal transmissions using a plurality of transmitter and receiver pairs arranged in a one-dimensional array.

15. A method according to claim 9, wherein said transmitting step and said receiving step include transmitting and receiving said sequence of acoustic signal transmissions using a plurality of transmitter and receiver pairs arranged in a two-dimensional array.

16. A method according to claim 9, wherein said comparison step includes comparing a representation of said phase data with a predetermined representation of an reference object to determine if said measured phase data represents said reference object.

* * * * *